United States Patent
Bandyopadhyay et al.

(10) Patent No.: US 7,314,593 B2
(45) Date of Patent: Jan. 1, 2008

(54) PROCESS FOR PREPARING IMPROVED SILICON CARBIDE POWDER

(75) Inventors: Siddhartha Bandyopadhyay, West Bengal (IN); Himadri Sekhar Maity, West Bengal (IN)

(73) Assignee: Council of Scientific and Industrial Research, New Delhi (IN)

( * ) Notice: Subject to any disclaimer, the term of this patent is extended or adjusted under 35 U.S.C. 154(b) by 435 days.

(21) Appl. No.: 10/974,020

(22) Filed: Oct. 27, 2004

(65) Prior Publication Data

US 2006/0087063 A1   Apr. 27, 2006

(51) Int. Cl.
*C04B 35/64* (2006.01)
*C04B 35/01* (2006.01)

(52) U.S. Cl. ............... 264/655; 264/674; 264/682

(58) Field of Classification Search .......... 264/655, 264/682, 674; 423/345; 501/88
See application file for complete search history.

(56) References Cited

U.S. PATENT DOCUMENTS

| 3,288,615 A | * | 11/1966 | Estes et al. | ............ 501/85 |
|---|---|---|---|---|
| 3,321,727 A | * | 5/1967 | Schrewelius | ............ 338/330 |
| 3,421,577 A | * | 1/1969 | Valyi | ............ 165/170 |
| 3,754,076 A | | 8/1973 | Cutler | |
| 3,836,356 A | | 9/1974 | Irani | |
| 3,920,446 A | | 11/1975 | Iran | |
| 4,238,434 A | * | 12/1980 | Enomoto et al. | ............ 264/655 |
| 4,609,527 A | * | 9/1986 | Rinderle et al. | ............ 419/32 |
| 5,147,722 A | * | 9/1992 | Koslow | ............ 428/402 |
| 5,525,556 A | | 6/1996 | Dunmead et al. | |
| 6,610,113 B1 | * | 8/2003 | Mehrotra et al. | ............ 51/308 |
| 6,620,214 B2 | * | 9/2003 | McArdle et al. | ............ 51/298 |
| 2004/0148868 A1 | * | 8/2004 | Anderson et al. | ............ 51/308 |

* cited by examiner

*Primary Examiner*—Carlos Lopez
(74) *Attorney, Agent, or Firm*—Nixon & Vanderhye P.C.

(57) ABSTRACT

Improved silicon carbide powder is prepared by carbothermal reduction of silica by introducing β-SiC powder simultaneously with iron in the starting composition resulting into a precursor powder which after complete reduction contains at least 90% SiC preferably rich in the β-phase. The main advantage, among others, is cost effectiveness. Silicon carbide powder finds wide usage in the manufacture of products suitable for refractory and engineering applications.

9 Claims, No Drawings

PROCESS FOR PREPARING IMPROVED SILICON CARBIDE POWDER

FIELD OF THE INVENTION

The present invention relates to a process for the preparation of improved silicon carbide powder.

BACKGROUND OF THE INVENTION

Silicon carbide powder finds wide usage in the manufacture of products suitable for refractory and engineering applications. Silicon carbide powder is useful for the preparation of products suitable for refractory and engineering applications.

It is known in the art to prepare silicon carbide powder by firing an intimately mixed green mixture of fine silica ($SiO_2$) with carbon (C) under flowing argon gas atmosphere by following the equation as follows:

$$SiO_2 + 3C = SiC + 2CO \qquad (1)$$

Rice husk has conventionally been used as the source of fine silica (Lee et al. in Am. Ceram. Bull., Vol. 54, No. 2, pp. 195-98, 1975 titled "Formation of silicon carbide from rice hulls"). Krishnarao et al. (Ceram. Inter., Vol. 18, No. 4, 1992, pp. 243-49, titled "Distribution of silica in rice husks and its effects on the formation of silicon carbide") study and describe the importance of distribution of silica in the starting material and the role of catalyst. A maximum yield of 60% SiC is the theoretical amount that is producible when rice husk is used as starting material.

Guterl et al. (J. Eur. Ceram Soc., vol. 19, No. 4, 1999, pp. 427-32, entitled "SiC material produced by carbothermal reduction of a freeze gel silica-carbon artefact") teaches the fineness of both silica and carbon initial particle size. It is taught that monodispersed, extremely fine-sized silica powder with mean particle size ~25 nm was effective for silicon carbide preparation. In this study, a sol-gel route was used to prepare the extreme fine starting silica powder. Cervic et al. (Ceram. Inter., Vol. 21, No. 4, 1995, entitled "A comparison of sol-gel derived SiC powders from Saccharose and activated carbon") teach the importance of an extremely fine sized starting carbon with specific surface area of >950 $m^2g^{-1}$. In both above cases, a firing temperature of 1550° C. was required.

The requirement of further high firing temperature of 1550° to 1800° C. is reported in Martin et al. (J. Eur. Ceram Soc., vol. 18, No. 12, 1998, pp. 1737-42, titled "Synthesis of nanocrystalline SiC powder by carbothermal reduction"). Hanna et al. (Brit. Ceram. Trans. J., Vol. 84, No. 1, 1985, pp. 18-21, titled "Silicon carbide and nitride from rice hulls-III: Formation of silicon nitride") teaches the use of a source of iron in the starting composition under a flow of ammonia gas in place of argon/nitrogen gas and above 1350° C. silicon carbide. A maximum of 90% of the starting silica could be reduced up to 1500° C. resulting in a mixture of silicon carbide and silicon nitride when an amount >6 wt. % iron was used in the starting mixture.

The drawbacks of the above processes are manifold. Firstly, extremely fine grain sized silica is required which has to be prepared following the sol-gel technique resulting in enhanced costs. Secondly, the use of large excess of carbon in the starting mixture involves an additional firing at above 500° C. in air of the post-reacted product where the unreacted carbon has to be burnt off. Additionally, the failure of achieving carbidation up to the theoretical value signifies that some residual silica remains in the product where no other phase appears in the reaction product. The residual silica may be harmful in the ultimate use of the material. The use of iron produces silicon carbide along with silicon nitride where an addition of ~7 wt. % iron is required in case ammonia is the reacting gas.

The major drawbacks of the above noted hitherto known prior art processes are:

1. The starting silica particle size should be extremely small with surface area of the powder at least greater than 150 $m^2/g$ which is produced following a very expensive sol-gel process.

2. The starting carbon particle size should also be extremely fine with surface area of the powder preferably greater than 150 $m^2/g$.

OBJECTS OF THE INVENTION

The main object of the present invention is to provide a process for the preparation of improved silicon carbide powder which obviates the drawbacks of the hitherto known prior art given above.

Another object of the invention is to provide a process for the preparation of improved silicon carbide powder containing at least 90 wt. % of phase.

Another object of the present invention is to provide a process for the preparation of improved silicon carbide powder wherein pure silica, a source of carbon such as activated charcoal, β-silicon carbide, a source of iron such as ferric nitrate and pure nitrogen gas are used as starting materials.

Another object of the present invention is to provide a process for the preparation of improved silicon carbide powder from a synergistic composition wherein iron is used as a catalyst and β-silicon carbide as seeding material in the starting materials.

Another object of the present invention is to provide a process wherein a lower temperature of firing is required thus making the process cost effective.

SUMMARY OF THE INVENTION

The present invention provides to a process for the preparation of improved silicon carbide powder by carbothermal reduction of silica by inventive steps of introducing β-SiC powder simultaneously with iron in the starting composition resulting into a precursor powder which after complete reduction contains at least 90% SiC preferably rich in the β-phase. The main advantage, among others, is cost effectiveness. Silicon carbide powder finds wide usage in the manufacture of products suitable for refractory and engineering applications. Thus, any improvement in the economy of the process is important and desirable.

The process for the preparation of improved silicon carbide powder of the present invention, uses as starting material the synergistic composition as described and claimed in our co-pending patent application Ser. No. 10/974,014. The synergistic composition of our co-pending patent application Ser. No. 10/974,014 consists of a mixture of a source of pure silica such as silicon dioxide, a source of carbon such as activated charcoal, B-silicon carbide and a source of iron such as ferric nitrate. The cost effective synergistic composition is useful for the preparation of improved silicon carbide powder containing at least 90% SiC preferably rich in the β-phase.

Accordingly the present invention provides a process for the preparation of improved silicon carbide powder, which comprises homogenising and powdering a composition consisting essentially of: 41 to 53 weight % $SiO_2$, 26 to 35 weight % C, 3.5 to 14 weight % β-SiC and 12 to 26 weight % $Fe(NO_3)_3.9H_2O$, drying and passing the powder through 100 mesh, pressing the powder so obtained to form green compacts, sintering the green compacts at a temperature in the range of 1475 to 1550° C. in argon atmosphere, grinding the sintered mixture to obtain silicon carbide powder.

In an embodiment of the present invention, the starting materials $SiO_2$, C and β-SiC are pure and are in the form of a powder.

In another embodiment of the present invention, the $Fe(NO_3)_3$ is mixed in the mixture in the form of a solution in acetone.

In still another embodiment of the present invention, the homogenising and powdering is effected for a time period ranging between 2 to 8 hours in a ball mill along with alumina balls of size in the range of 5 to 15 mm, the ball to powder ratio is in the range of 6:1 to 15:1, and wherein the milling is done in a liquid medium of acetone for which the water content is 0.2%.

In yet another embodiment of the present invention, during milling, the ball to powder ratio is preferably around 9:1.

In still yet another embodiment of the present invention, the pressing is done uniaxially at a pressure ranging from 1 to 50 $Kg/cm^2$.

In a further embodiment of the present invention, the SiC contains less than 30% β-phase.

In a still further embodiment of the present invention, the argon gas contains less than 4 ppm. of oxygen and water vapour each.

DETAILED DESCRIPTION OF THE INVENTION

The present invention provides a process for the preparation of improved silicon carbide powder comprising first homogenising and powdering a composition consisting essentially of: 41 to 53 weight % $SiO_2$, 26 to 35 weight % C, 3.5 to 14 weight % β-SiC and 12 to 26 weight % $Fe(NO_3)_3.9H_2O$. the homogenised powder is dried and then passed through 100 mesh and the powder so obtained is pressed to form green compacts. The green compacts are sintered preferably at a temperature in the range of 1475 to 1550° C. in argon atmosphere and then ground to obtain silicon carbide powder.

The starting materials $SiO_2$, C and β-SiC are pure and are in the form of a powder. Preferably, the $Fe(NO_3)_3$ is mixed in the mixture in the form of a solution in acetone. The homogenising and powdering is effected for a time period ranging between 2 to 8 hours in a ball mill along with alumina balls of size in the range of 5 to 15 mm, the ball to powder ratio is in the range of 6:1 to 15:1, and wherein the milling is done in a liquid medium of acetone for which the water content is 0.2%. During milling, the ball to powder ratio is preferably around 9:1. The pressing is done uniaxially at a pressure ranging from 1 to 50 $Kg/cm^2$.

The SiC contains less than 30% β-phase. The argon gas contains less than 4 ppm. of oxygen and water vapour each.

In general, the carbothermic reduction of silica is sensitively guided by the initial particle size of the reactants. Under extreme reducing condition, a solid-solid reaction takes place where $SiO_2$ is reduced by solid Carbon to form a mixture of vapour phase of SiO and CO. In a second set of reactions, SiO vapour reacts to form solid SiC. The formation of SiC starts from a heterogeneous nucleation on C and $SiO_2$ surface followed by growth from the gas phase reaction. Both the first phase of reactions as well as the nucleation are favoured by the decrease in particle size of the starting solid reactants. When a small amount of finely divided α-SiC is used, these act as seeding material. These like phases themselves act as the heterogeneously nucleated sites and strongly favour SiC formation. On the other hand, the carbide formation is believed to relate to the existence of a Fe—Si liquid phase when iron is used in the starting mixture. The appearance of Fe and Si in the reaction site are due to the reduction of their respective oxides during firing. When the reaction proceeds, the liquid becomes saturated with carbon causing the precipitation of SiC. A continuous growth of the carbide occurs with simultaneous dissolution of silicon and carbon into the liquid to make it saturated. Except for solubility, the growth is assumed to be controlled by the diffusivity of the constituent elements in the liquid after their dissolution. A larger amount of iron therefore, favours the formation of a larger amount of liquid which makes the $SiO_2$ and C particles wet enough to serve as centres where the nucleation can take place. In the present case, it is believed that the added β-SiC particles in the starting mixture itself serve as the "like"—nucleation sites where from growth can occur. Therefore, the reaction does not require large amount of iron and produces similar yield at lower temperature of around 1500° C. which otherwise results from a reaction temperature of >1540° C.

The novelty of the present invention lies in that the product obtained contain at least 90% of SiC and from a reaction which commences at lower temperature than the existing processes due to use of reduced amount of catalyst. The novelty of the reaction is that it does not require large amount of iron and produces similar yield at lower temperature of around 1500° C. which otherwise results from a reaction temperature of >1540° C. The novelty in the selection of a synergistic compositions different from other processes that give the desired product after specified processing. Further inventive step lies in introducing β-SiC powder as nucleating seeding agent simultaneously with iron.

Thus the present invention relates to a process for the preparation of silicon carbide powder which involves carbothermal reduction of silica powder by inventive steps of introducing β-SiC powder simultaneously with some iron in the starting composition resulting into a precursor powder which after complete reduction contain at least 90% SiC preferably rich in the β-phase with advantages such as cost effectiveness.

The process of the present invention for the preparation of silicon carbide powder is described below in detail:

1. Pure and powdered $SiO_2$, C and β-SiC and were taken as starting materials.

2. The accurately weighed $Fe(NO_3)_3$ was made into a solution of acetone and was mixed with the above mixture.

3. Accurately weighed appropriate proportions of starting materials of compositions of the present investigation were taken in an alumina pot of a ball mill along with alumina balls (size around 5 to 15 mm) for ball milling wherein the ball: powder ratio were kept in the range of 6:1 to 15:1, preferably around 9:1 and wherein the milling was done in a liquid medium of acetone for which the water content was 0.2%. The milling time was ranging between 2 to 8 hours.

4. After milling the powder was separated from the balls, sieved and was dried.

5. The milled powder was taken in a steel mould and was uniaxially pressed with pressure ranging from 1 to 50 Kg/cm$^2$.

6. The pressed green billets were taken in a graphite resistance heating furnace and were fired in argon gas atmosphere at a temperature in the range of 14750 to 1550° C.

7. Grinding by conventional methods to obtain silicon carbide powder.

The following examples are given by way of illustration of the present invention and should not be construed to limit the scope of the invention:

EXAMPLE 1

A composition containing SiO$_2$—43.11 weight %, C—29.32 weight %, SiC—6.04 weight % and Fe(NO$_3$)$_3$.9H$_2$O—21.53 weight % was ball milled for 5 hour, dried, cold pressed under uniaxial pressing and was fired at 1525° C. for 5 hour in an argon gas atmosphere under a linear gas flow rate of 40 mh$^{-1}$ at a pressure of 0.12 MPa. The firing weight loss was 116% of theoretical, calculated by following the equation no. 1 as stated above. The sample was blackish grey in colour containing soft agglomerates, grindable to produce fine sized powder. The x-ray diffraction shows SiC as the only crystalline phase present in the product.

EXAMPLE 2

A composition containing SiO$_2$—43.11 weight %, C—29.32 weight %, SiC—6.04 weight % and Fe(NO$_3$)$_3$.9H$_2$O—21.53 weight % was ball milled for 5 hour, dried, cold pressed under uniaxial pressing and was fired at 1500° C. for 5 hour in an argon gas atmosphere under a linear gas flow rate of 40 mh$^{-1}$ at a pressure of 0.12 MPa. The firing weight loss was 109% of theoretical, calculated by following the equation no. 1 as stated above. The sample was blackish grey in colour containing soft agglomerates, grindable to produce fine sized powder. The x-ray diffraction shows SiC as the only crystalline phase present in the product.

EXAMPLE 3

A composition containing SiO$_2$—43.11 weight %, C—29.32 weight %, SiC—6.04 weight % and Fe(NO$_3$)$_3$.9H$_2$O—21.53 weight % was ball milled for 5 hour, dried, cold pressed under uniaxial pressing and was fired at 1485° C. for 5 hour in an argon gas atmosphere under a linear gas flow rate of 40 mh$^{-1}$ at a pressure of 0.12 MPa. The firing weight loss was 103% of theoretical, calculated by following the equation no. 1 as stated above. The sample was blackish grey in colour containing soft agglomerates, grindable to produce fine sized powder. The x-ray diffraction shows SiC as the only crystalline phase present in the product.

EXAMPLE 4

A composition containing SiO$_2$—41.77 weight %, C—28.41 weight %, SiC—8.77 weight % and Fe(NO$_3$)$_3$.9H$_2$O—21.05 weight % was ball milled for 5 hour, dried, cold pressed under uniaxial pressing and was fired at 1525° C. for 5 hour in an argon gas atmosphere under a linear gas flow rate of 40 mh$^{-1}$ at a pressure of 0.12 MPa. The firing weight loss was 132% of theoretical, calculated by following the equation no. 1 as stated above. The sample was blackish grey in colour containing soft agglomerates, grindable to produce fine sized powder. The x-ray diffraction shows SiC as the only crystalline phase present in the product.

EXAMPLE 5

A composition containing SiO$_2$—41.77 weight %, C—28.41 weight %, SiC—8.77 weight % and Fe(NO$_3$)$_3$.9H$_2$O—21.05 weight % was ball milled for 5 hour, dried, cold pressed under uniaxial pressing and was fired at 1500° C. for 5 hour in an argon gas atmosphere under a linear gas flow rate of 40 mh$^{-1}$ at a pressure of 0.12 MPa. The firing weight loss was 121% of theoretical, calculated by following the equation no. 1 as stated above. The sample was blackish grey in colour containing soft agglomerates, grindable to produce fine sized powder. The x-ray diffraction shows SiC as the only crystalline phase present in the product.

EXAMPLE 6

A composition containing SiO$_2$—41.77 weight %, C—28.41 weight %, SiC—8.77 weight % and Fe(NO$_3$)$_3$.9H$_2$O—21.05 weight % was ball milled for 5 hour, dried, cold pressed under uniaxial pressing and was fired at 1485° C. for 5 hour in an argon gas atmosphere under a linear gas flow rate of 40 mh$^{-1}$ at a pressure of 0.12 MPa. The firing weight loss was 117% of theoretical, calculated by following the equation no. 1 as stated above. The sample was blackish grey in colour containing soft agglomerates, grindable to produce fine sized powder. The x-ray diffraction shows SiC as the major crystalline phase.

The Main Advantages of the Process of the Present Invention are:

1. The complete reduction is possible under lower reaction temperature thereby making the process cost effective.

2. The process allows the use of starting silica which may be prepared only by grinding of naturally occurring and abundantly available silica in a mill rather than fine silica produced from a sol-gel technique thereby making the process still economic.

3. The process allows the use of starting carbon with surface area only in the range of around 35 m$^2$/g in comparison to that in the range of 150-650 m$^2$/g used in majority of the prior arts thereby making the process further economic.

4. The process allows the use of lower amount of iron which is beneficial so far as the quality of the produced powder is concerned.

5. The obtained precursor powder is sinterable with appropriate additives to produce dense material suitable for use in refractory and other applications.

We claim:
1. A process for the preparation of improved silicon carbide powder, said process comprising:
 (a) homogenizing and powdering a composition consisting essentially of: 41 to 53 weight % SiO$_2$, 26 to 35 weight % C, 3.5 to 14 weight % β-SiC and 12 to 26 weight % Fe(NO$_3$)$_3$.9H$_2$O,
 (b) drying and passing a powder resulting from step (a) through 100 mesh,
 (c) pressing the powder so obtained from step (b) to form green compacts,
 (d) sintering the green compacts, and

(e) grinding the sintered compacts to obtain silicon carbide power.

2. A process as in claim 1 wherein the starting materials $SiO_2$, C and β-SiC are pure and are in the form of a powder.

3. A process as in claim 1 wherein the $Fe(NO_3)_3$ is mixed in the mixture in the form of a solution in acetone.

4. A process as in claim 1 wherein:
the homogenizing and powdering is effected for a time period ranging between 2 to 8 hours in a ball mill along with alumina balls of size in the range of 5 to 15 mm,
the ball to powder ratio is in the range of 6:1 to 15:1, and
the milling is done in a liquid medium of acetone for which the water content is 0.2%.

5. A process as in claim 1 wherein the sintering is carried out at a temperature in the range of 1475 to 1550° C. and in argon atmosphere.

6. A process as in claim 1 wherein during milling, the ball to powder ratio is about 9:1.

7. A process as in claim 1 wherein the pressing is done uniaxially at a pressure ranging from 1 to 50 Kg/cm$^2$.

8. A process as in claim 1 wherein the SiC contains less than 30% β-phase.

9. A process as in claim 5 wherein the argon gas contains less than 4 ppm. of oxygen and water vapor each.

* * * * *